US008332418B1

(12) United States Patent
Giordani et al.

(10) Patent No.: US 8,332,418 B1
(45) Date of Patent: Dec. 11, 2012

(54) COLLABORATIVE FILTERING TO MATCH PEOPLE

(75) Inventors: Patrick John Giordani, Pasadena, CA (US); Carlos A. Moreno, Alhambra, CA (US); Vaclav Petricek, Cambridge (GB)

(73) Assignee: eHarmony, Inc., Santa Monica, CA (US)

( * ) Notice: Subject to any disclaimer, the term of this patent is extended or adjusted under 35 U.S.C. 154(b) by 393 days.

(21) Appl. No.: 12/218,509

(22) Filed: Jul. 14, 2008

(51) Int. Cl.
*G06F 7/00* (2006.01)
*G06F 17/30* (2006.01)

(52) U.S. Cl. ......... 707/758; 707/722; 707/706; 707/736

(58) Field of Classification Search .................. 707/706, 707/722, 736, 758, 748; 709/205; 705/5, 705/319, 1.1, 37
See application file for complete search history.

(56) References Cited

U.S. PATENT DOCUMENTS

| | | | | |
|---|---|---|---|---|
| 6,266,649 | B1 | 7/2001 | Linden et al. | |
| 7,203,674 | B2 * | 4/2007 | Cohen | 1/1 |
| 7,428,321 | B1 | 9/2008 | Shah et al. | |
| 7,450,740 | B2 | 11/2008 | Shah et al. | |
| 7,617,160 | B1 * | 11/2009 | Grove et al. | 705/500 |
| 7,885,902 | B1 * | 2/2011 | Shoemaker et al. | 705/319 |
| 2002/0040310 | A1 * | 4/2002 | Lieben et al. | 705/7 |
| 2003/0078976 | A1 * | 4/2003 | Gordon | 709/205 |
| 2003/0191673 | A1 * | 10/2003 | Cohen | 705/5 |
| 2006/0018522 | A1 | 1/2006 | Sunzeri et al. | |
| 2006/0059159 | A1 | 3/2006 | Truong et al. | |
| 2006/0242053 | A1 * | 10/2006 | Avital | 705/37 |
| 2007/0192106 | A1 * | 8/2007 | Zilca | 704/270 |
| 2008/0052312 | A1 | 2/2008 | Tang et al. | |
| 2008/0162157 | A1 * | 7/2008 | Daniluk | 705/1 |
| 2008/0279419 | A1 | 11/2008 | Kluesing et al. | |
| 2008/0317298 | A1 | 12/2008 | Shah et al. | |
| 2009/0060288 | A1 | 3/2009 | Myers et al. | |
| 2009/0060289 | A1 | 3/2009 | Shah et al. | |
| 2009/0070133 | A1 | 3/2009 | Bonilla et al. | |
| 2009/0116704 | A1 | 5/2009 | Shah et al. | |
| 2009/0319288 | A1 | 12/2009 | Slaney et al. | |
| 2010/0262611 | A1 * | 10/2010 | Frind | 707/748 |

OTHER PUBLICATIONS

Linden et al., "Amazon.com Recommendations: Item-to-Item Collaborative Filtering," IEEE Internet Computing, Jan.-Feb. 2003, pp. 76-80, IEEE Computer Society.

* cited by examiner

*Primary Examiner* — Giovanna Colan
(74) *Attorney, Agent, or Firm* — Van Pelt, Yi & James LLP

(57) ABSTRACT

People are matched by obtaining, for a set of people, response information associated with previous matches the set of people have been a part of. For a person being matched, response information associated with previous matches the person being matched has been a part of is obtained. A match candidate is selected from a set of match candidates based at least in part on (1) the response information associated with the person being matched and (2) the response information associated with the set of people. Information associated with the selected match candidate is sent to the person being matched and/or information associated with the person being matched is sent to the selected match candidate.

22 Claims, 9 Drawing Sheets

Match candidates selected for person being matched

COLLABORATIVE FILTERING TO MATCH PEOPLE

BACKGROUND OF THE INVENTION

There are a number of techniques used by match making systems (e.g., online match making systems) to match people. One technique is to use specified preferences and provided demographics to match people. For example, one person may specify he is interested in women who live within 10 miles, with black hair, ages 35-45, and who are college graduates. The system then matches that person with people based on the information each person in the system provides (e.g., about their gender, residence, physical description, age, education, etc.). Another technique is to match people based on psychographic data. In some cases (e.g., used by eHarmony.com) specified preferences and psychographic data are used to make matches. Using the psychographic data, the system selects matches based on an estimated satisfaction.

In some cases, one or both of the people in a match do not respond positively to the other person. For example, a match making system may make 10 matches for a user and sends information about the 10 selected match candidates to the person being matched. In some cases, the person being matched reviews the information (e.g., a picture, a self-description, etc.) but decides not to contact one or more of the selected match candidates. Some or all of the matches are thus underutilized or are "wasted." In some cases, two people who are matched contact each other but decide not to pursue further contact (e.g., after a written exchange, a telephone call, or an in-person meeting). It would be desirable if new techniques were developed in which the person being matched is more likely to reach out to the selected match candidates and/or the matched people are more likely to continue contacting each other after an initial in-person meeting or other form of contact.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
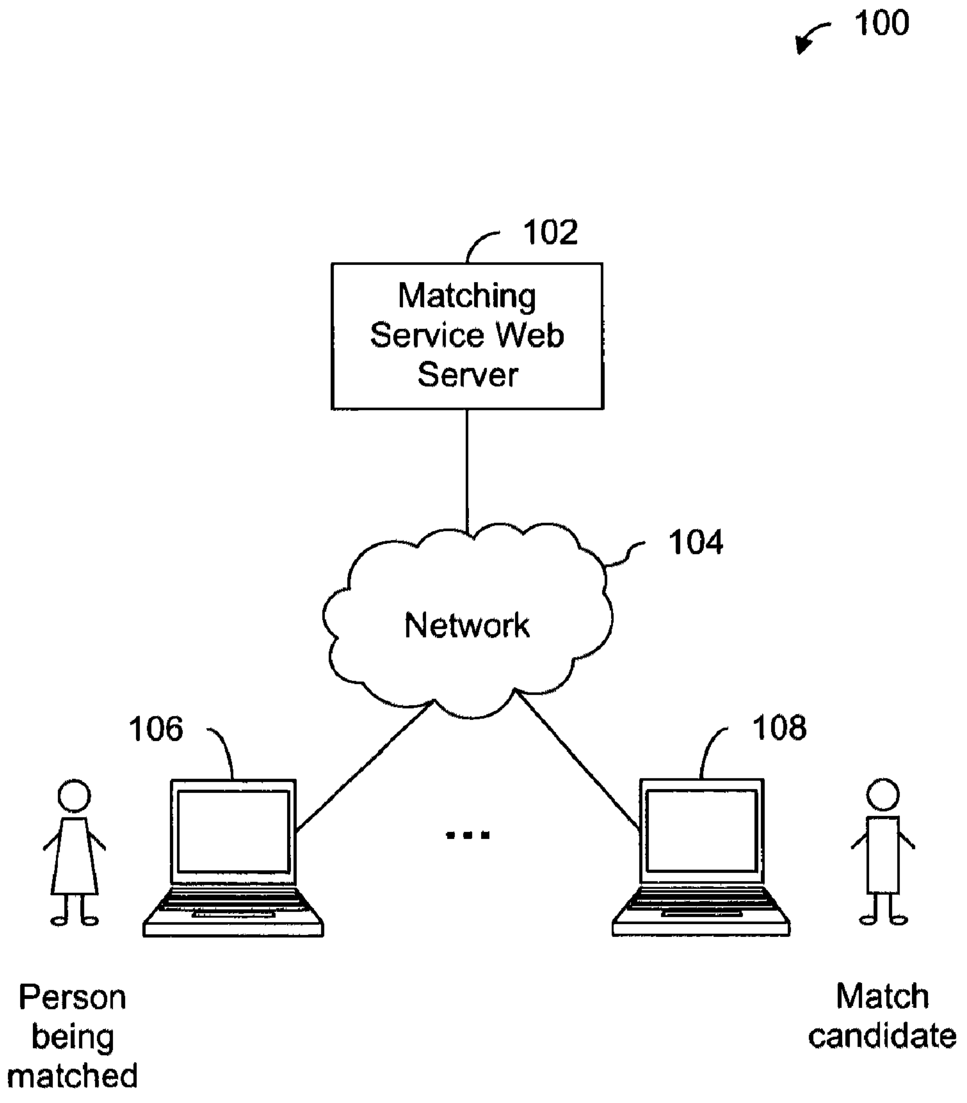
FIG. 1 is a system diagram showing an embodiment of a system configured to perform collaborative filtering.

FIG. 1 is a system diagram showing an embodiment of a system configured to perform collaborative filtering. In the example shown, system 100 includes network 104. Network 104 is used to connect matching service web server 102 with computer 106 (associated with a person being matched) and computer 108 (associated with a match candidate). A person being matched is more generally referred to as a user or member of a match making system. Similarly, a more general term for a match candidate is a user or member. It is to be understood that the terms "match candidate" and "a person being matched" are terms relative to a particular match being made. For example, the person associated with computer 108 in some cases is the person being matched and the person associated with computer 106 would in that case be a match candidate. Although not shown, system 100 includes other users in addition to the two users shown.

In various embodiments, network 104 includes a variety of technologies, protocols, or networks such as wired/wireless networks, mobile or cellular voice or data networks, broadband networks, Internet or web related protocols, etc. Although this example shows computers, in other embodiments, users of a system connect to and/or communicate with a matching service via some other device or communication channel (e.g., a mobile telephone, letters exchanged via mail, etc.).

In this example, the matching service is web-based. For a particular person being matched, server 102 selects one or more match candidates. Once the matches are determined, the person being matched is notified about their matches and some information about the selected match candidates is provided. In one example, no picture is provided to the person being matched and the person decides whether to communicate with a particular person based on other information, such as a brief description written by that person. In some embodiments, the selected match candidate is also made aware of the person to whom they have been matched. In some embodiments, communication between two matched people is facilitated or otherwise managed by matching service 104. For example, the people may be required to login to a website, submit a message, and return later to access a response (if any).

The lifecycle of a user (also referred to as a member) starts when a person joins a matching service. For example, a user may sign up as a member of eHarmony.com. As a user, the person is both a person being matched and a match candidate for other users. In one example, a matching service agrees to provide 10 matches and additional matches can be made for additional fees. The lifecycle of the user ends when the user leaves the matching service because, for example, that person has entered a committed relationship or the user no longer desires the services of the match making system.

Over the lifecycle of a user, server 102 collects a variety of information about the user. In some embodiments, server 102 records which selected match candidates a particular person decides to contact. For example, a person may be matched with 10 people but only contacts 6 of the 10 people. In some embodiments, server 102 records a response or rating associated with how much a person likes another person to whom they have been matched with. In one example, this response or rating is after contact with a person, such as an in-person meeting, a telephone call, or a written exchange. In another example, the response or rating is prior to contact with the person and is in response to a person's profile, picture, description, etc.

In general, collaborative filtering is technique that collects a repository or other (relatively large) collection of response information and makes matches based on the collected information. By using a collection of known or historic response information to make matches, the likelihood of a positive response by a user of the system to newly made match is improved. In some embodiments, statistical techniques are used to determine similar users and make matches based on previous matches for those similar users.

This figure and other figures are merely examples and other embodiments may vary from the examples shown herein. For example, although this example shows a woman as the person being matched and men as the match candidate(s), some other embodiments have different gender combinations (e.g., men/women, women/women, and men/men).

Figure 2:
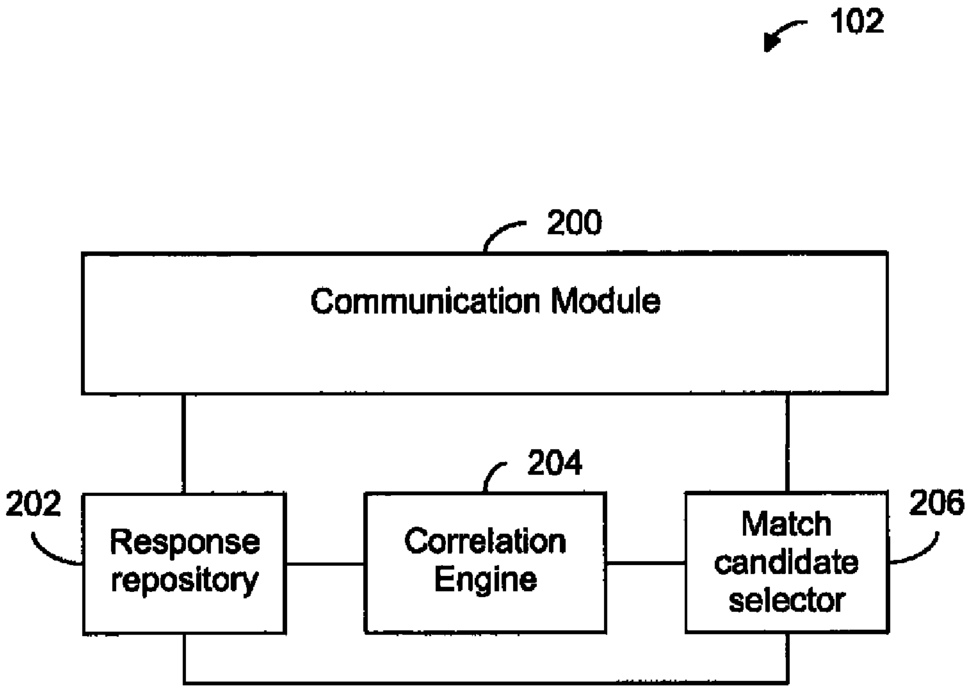
FIG. 2 is a diagram showing an embodiment of a matching service web server configured to perform collaborative filtering.

FIG. 2 is a diagram showing an embodiment of a matching service web server configured to perform collaborative filtering. In the example shown, one embodiment of server 102 from FIG. 1 is shown. In some embodiments, a matching service web server is implemented differently than the example shown herein. Server 102 includes communication module 200. Communication module 200 is configured to communicate with external devices and/or users, such as computers 106 and 108 via network 104 in FIG. 1. Since in this example server 102 is a web server, communication module 200 is configured to perform Internet related communication. In this example, communication module 200 is coupled to response repository 202 and match candidate selector 206. For example, response repository 202 may receive information from users of the system via communication module 200; information about selected match candidates is passed to the appropriate users via communication module 200.

Response repository 202 is configured to store response information from users and manage that information as appropriate. For example, if the system is configured to ask a user for a rating or response after two people have contacted each other, that rating or response is stored in response repository 202. In some embodiments, response repository 202 monitors and stores which selected match candidates a user contacts and/or which match candidates a user has been matched with but did not contact. In various embodiments, the form of a response or rating is expressed as a number (e.g., an integer between 1 and 10), a qualitative description (e.g., "I really liked that person," "I sort of liked that person" or "I did not like that person"), or a state (e.g., "Contact," "Did not contact," or "No information"). In this example, response repository 202 stores the person from whom a response is received or who generated the response information and the person to whom the response or ranking pertains to. For example, suppose the two people shown in FIG. 1 are matched and server 102 is configured to record whether or not the person being matched (associated with computer 106) actually contacts the selected match candidate (associated with computer 108). Response repository 202 records that the response information was generated by the person associated with computer 106 and that the information pertains to the person associated with computer 108.

In various embodiments, a response repository supports various functions or commands for searching, adding, deleting, manipulating, or otherwise accessing information stored within a response repository. Correlation engine 204 and match candidate selector 206 are coupled to response repository 202 and one or both may use such functions. In some embodiments, there is a "Return all responses" command to which response repository 202 will return all response information it has stored within it. Some other example commands include: "Return all responses associated with user X," "Return all responses in which user X has responded to another member," "Return all responses in which another member has responded to user X," and "Return all responses in which user X has responded to user Y." In various embodiments, a returned value to a command includes a strength or score of a response, a number of responses (if any), and/or the people associated with a set of response information.

Correlation engine 204 is configured to determine similar users. This is done by accessing information stored in response repository 202 (e.g., for all users as well as for a particular user) and determining similar users in the system for a given user (e.g., a given person being matched or a given match candidate). Any appropriate technique to determine similar users may be used. Some examples include a Pearson correlation, vector similarity, statistical techniques, etc. In some embodiments, correlation engine 204 determines two values for each possible similar user: a similarity value and a confidence value. In some embodiments, if the similarity value is above a first threshold and the confidence value is above a second threshold then a similar user is declared. In some embodiments, similarity values are used to rank users and process through the users from those with highest expected similarity to those with lowest expected similarity.

Based on the similar users determined by correlation engine 204, match candidate selector 206 selects one or more match candidates from a set of available match candidates. In some embodiments, match candidate selector 206 is configured to select a predefined number of matches (e.g., the top 10 match candidates with the highest similarity value and/or highest confidence value). In some embodiments, match candidate selector 206 is configured to select all match candidates above a certain threshold (e.g., with a certain confidence, a certain average response, etc.). In some embodiments, a system predicts how or the degree to which user A is going to respond to user B, how or the degree to which user B is going to respond to user A and then introduces such pairs that are most likely to engage in positive or desired behavior (e.g., mutual communication, achieving a certain stage in a guided communication, go on a date, marry, etc.)

In some embodiments, the set of people associated with the information stored in response repository 202 is not the same as the set of available match candidates from which match candidate selector 206 selects. For example, suppose a former member of a match making service was very active and provided a lot of response information about other users and/or for whom there is a lot of response information from other users. In some cases, it is useful to keep this information in response repository 202 and use this information to make matches, even though that particular person is no longer available as a match candidate (e.g., because (s)he is now in a committed relationship).

In some embodiments, one or more of the components of the system shown in FIG. 2 have adjustable parameters. In some applications, parameters are adjusted with time. For example, system administrators may start out with an initial set of parameters for correlation engine 204. As time passes, the system administrators can evaluate how successful the system is and (if desired) adjust the parameters by which correlations (or another sub-process) are performed. In one example, one parameter controls how many known responses must be provided by a user of the system before the techniques described herein are used. If the system administrators determine the current threshold is insufficient, the value of the corresponding parameter may be increased. In some embodiments, the correlation function incorporates weighting and some of parameters correspond to the weights used. In some embodiments, (new) parameter values are determined and set automatically.

Figure 3:
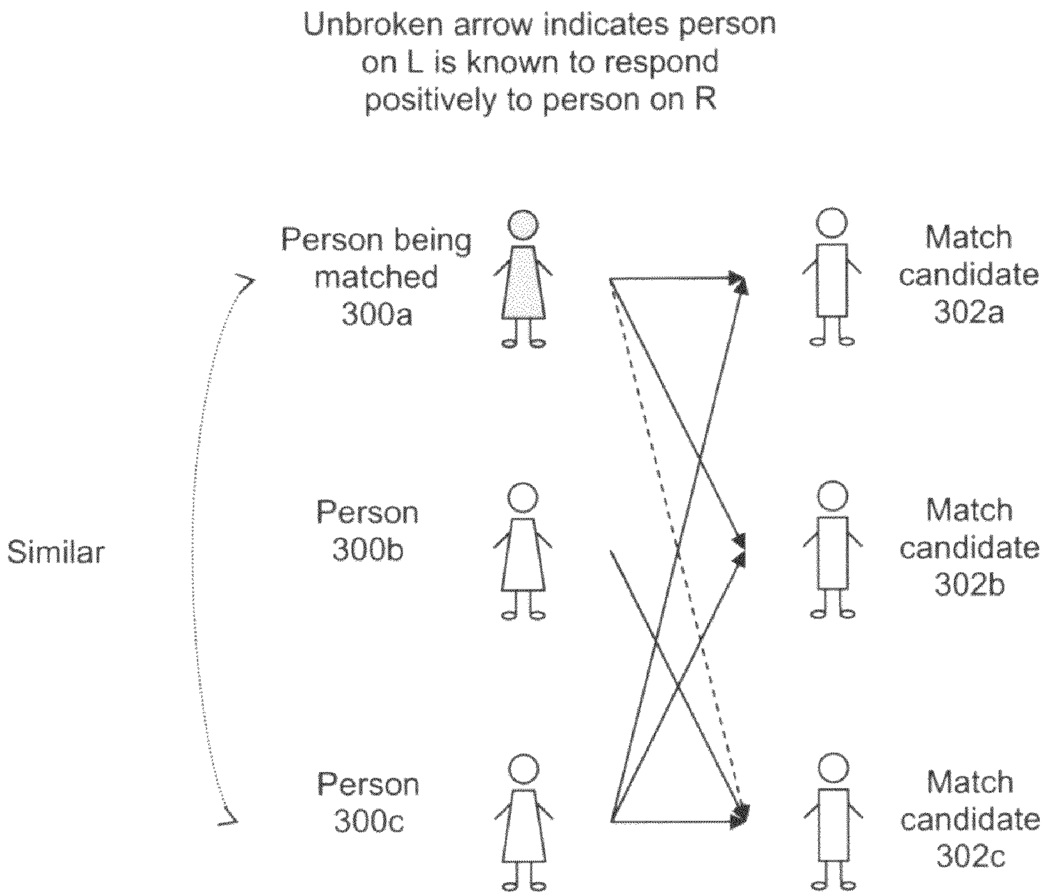
FIG. 3 is a diagram showing an embodiment of collaborative filtering based on people who have responses that are similar to that of a person being matched.

FIG. 3 is a diagram showing an embodiment of collaborative filtering based on people who have responses that are similar to that of a person being matched. In the example shown, people who provided response information (e.g., gave a ranking or contacted a person) are shown on the left and people to whom a response pertains to are shown on the right. An unbroken line between two people indicates that the person on the left is known to have responded positively to the person on the right. The person being matched (300*a*) is known to have responded positively to match candidates 302*a*-302*b*, person 300*b* is known to have responded positively to person 302*c*, and person 300*c* is known to have responded positively to all of match candidates 302*a*-302*c*.

Based on the known responses (indicated by the unbroken lines), the person being matched (300*a*) and person 300*c* have similar responses. Users 300*a* and 300*c* both responded positively to users 302*a*-302*b*. In some embodiments, identification of user 300*c* as a user who is similar to 300*a* is determined by correlation engine 204 of FIG. 2. Since those two users have similar responses, match candidate 302*c* is selected as a match for the person being matched (300*a*) since user 300*c* had a known, positive response to match candidate 302*c*.

The person providing the information (i.e., the person shown on the left in FIG. 3) may be either the person being matched or a match candidate who was selected for that person. In embodiments where the system is configured to solicit response information after contact between two matched people, either person may respond. For some embodiments of response information, only one person in a match is able to provide a response. For example, suppose the response information tracks whether a person contacts another person in a match. If only one person in the match is made aware of the match, then only that person is able to provide response information.

In some cases, a correlation engine identifies multiple users who are similar to a given person. For example, there may be other users who are similar to user 300*a* (based on the responses they provided) in addition to user 300*c*. In some embodiments, a weighted average of ratings or responses (e.g., from the multiple users who are identified as being similar) is used. In one example, weights are used. For example, a correlation engine returns a predicted score or weight for each pair of users. A particular set of users may be deemed good enough by having weights above a threshold but (at least in this example) each also has associated with him/her a weight that estimates the degree to which a user will respond positively to that person. This can be used to prioritize users. This is merely one example and in other embodiments other techniques are used.

In some embodiments, user ratings are combined (e.g., using weighting) into a single composite. In one example, users and/or their ratings are weighted proportionally based on their similarity (e.g., Pearson correlation, vector distances, dot products, etc.) to the target user for users who have rated enough users to have a stable estimate. In another example, users are weighted proportionally to a function of their similarity with the active user and the number of items this similarity is based upon (i.e., the most weight would be given to users who have rated a lot of items in a similar way as the target user.)

Figure 4:
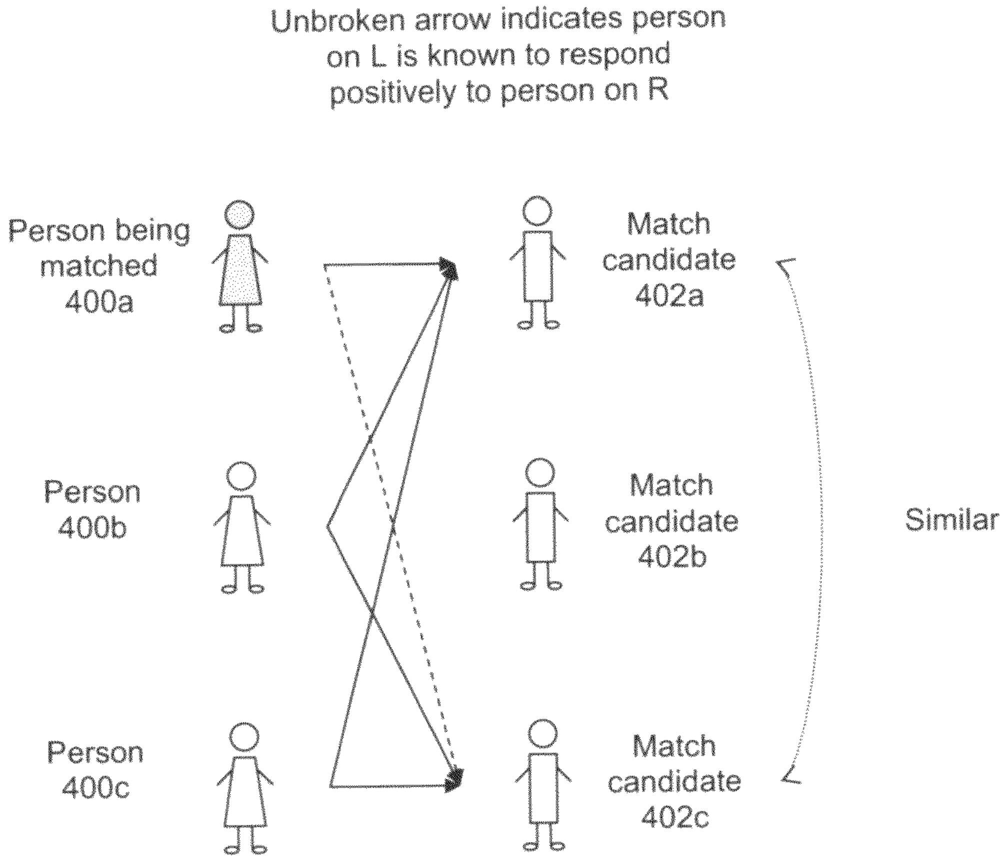
FIG. 4 is a diagram showing an embodiment of collaborative filtering based on similar match candidates.

FIG. 4 is a diagram showing an embodiment of collaborative filtering based on similar match candidates. FIG. 4 is similar to FIG. 3 in that people on the left have provided response information about people on the right and that an unbroken line between two people indicates the person on the left had a known, positive response to the person on the right. In this particular example, person 400*b* and person 400*c* had known, positive responses to both match candidates 402*a* and 402*c*. The person being matched (400*a*) had a positive response to match candidate 402*a*. Match candidates 402*a* and 402*c* are similar in that people who liked one tended to like the other. In some embodiments, similar match candidates are identified by correlation engine 204 of FIG. 2. Since the person being matched 400*a* is known to have responded positively to match candidate 402*a*, match candidate 402*c* is selected as a match since people who have liked match candidate 402*a* have also liked 402*c*.

In some embodiments, the techniques shown in FIGS. 3 and 4 are combined. For example, using the technique shown in FIG. 3 one score is output for a given match candidate and using the technique shown in FIG. 4 another score is output. In some embodiments, the two scores are combined, for example by multiplying the two. In some applications, multiplying is attractive since it tends to "reward" two scores where both are high and tends to "punish" scores where one or both scores are low. In some embodiments, some other manner of incorporating both techniques is used.

In some embodiments, the match candidates shown in FIGS. 3 and 4 in some embodiments are pre-screened. For example, eHarmony.com uses psychographic information to match people based on a number of factors. In some embodiments, a match candidate is pre-screened according to some other criteria besides psychographic information, such as user specified preference(s) (e.g., regarding age, gender, income, location, education, ethnicity/race, etc.). Alternatively, in some embodiments, a match candidate is not pre-screened or otherwise pre-selected.

In some embodiments, negative reviews or ratings are recorded and correlated. For example, after an in-person meeting, a telephone call, or other form of contact, a person may have the option of indicating they did not like the other person. A negative response may be reflected by a negative value, where a value of 0 corresponds to a neutral response.

In some embodiments, the techniques shown in FIGS. 3 and 4 are referred to as co-citation. FIGS. 3 and 4 are merely examples and in some embodiments other techniques besides co-citation are used.

Figure 5:
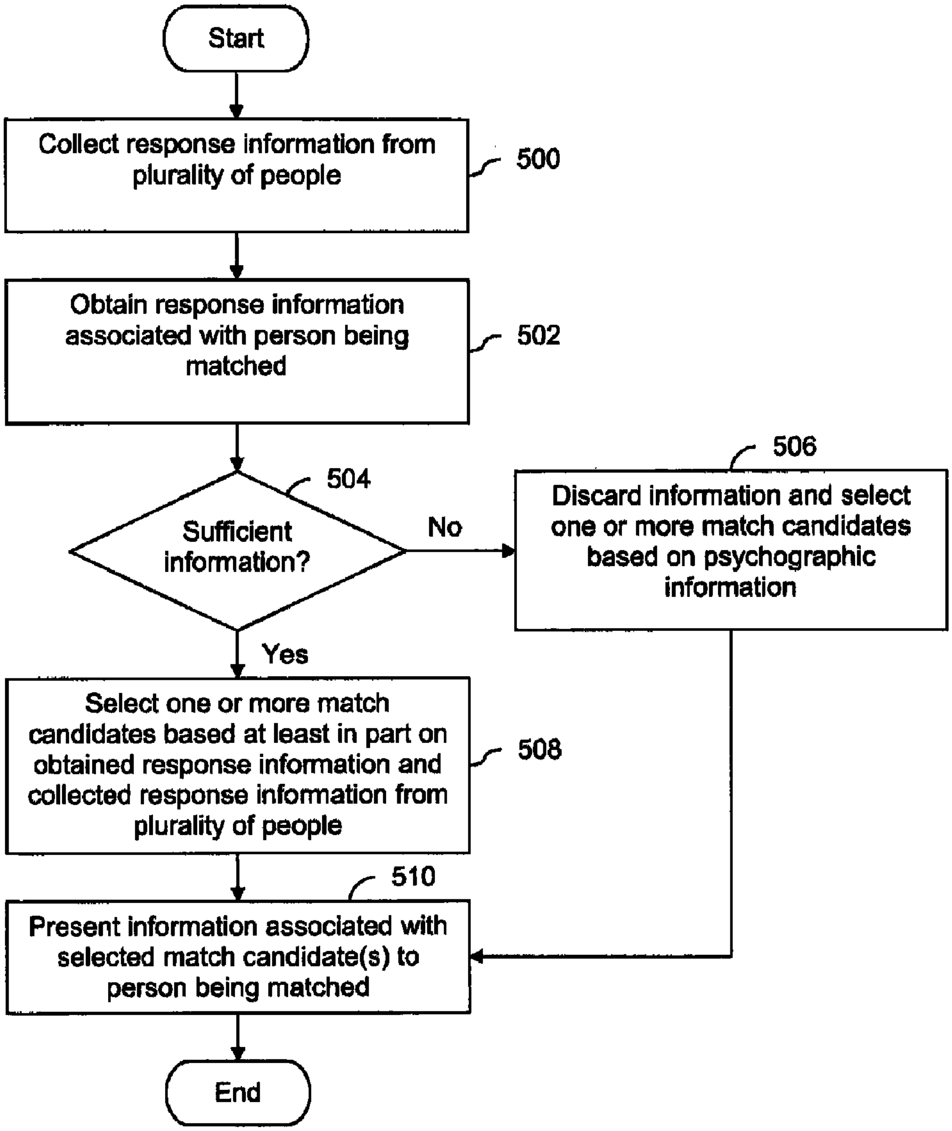
FIG. 5 is a flowchart illustrating an embodiment for matching people using collaborative filtering.

FIG. 5 is a flowchart illustrating an embodiment for matching people using collaborative filtering. In the example shown, the process is performed by the system of FIG. 2. At 500, response information is collected from a plurality of people. In some embodiments, at least some of the people from whom information is collected are (or were previously) members of the match making system. In some embodiments, response information is collected from some other source, such as a social networking website. At 502, response information associated with a person being matched is obtained. In some embodiments, the response information obtained 502 has been provided by or generated by the person being matched.

At 504, it is determined whether there is sufficient information. For example, correlation engine 204 of FIG. 2 may need a sufficient amount of response information in order to operate properly. In some embodiments, a decision at 504 is made based on the number of known responses for the person being matched.

If there is sufficient information, one or more match candidates is/are selected based at least in part on the obtained response information and the collected response information from a plurality of people at 508. Otherwise, at 506, the information is discarded and one or more match candidates is/are selected based on psychographic information. This is merely one example of how to select match candidates if there is insufficient information and in other embodiments some other technique is used at 506 to select match candidates. At 510, information associated with the selected match candidate(s) is presented to the person being matched. For example, the name of the match candidate, contact information, a picture, and/or a description written by the selected match candidate are presented to the person being matched.

In the example shown, there are two distinct modes. There does not need to be a "hard switch" between the two modes and in some embodiments the two predictors are both used by combining their votes.

In some embodiments, matches (e.g., new or additional matches) are delivered at 510 when a user completes communication (e.g., because one of the people chooses not to continue communicating, a communication is interrupted by external elements, etc.). In such cases, the user's utility from receiving such a match is higher than if a match were delivered when the user is engaged in communication with other match(es).

Figure 6:
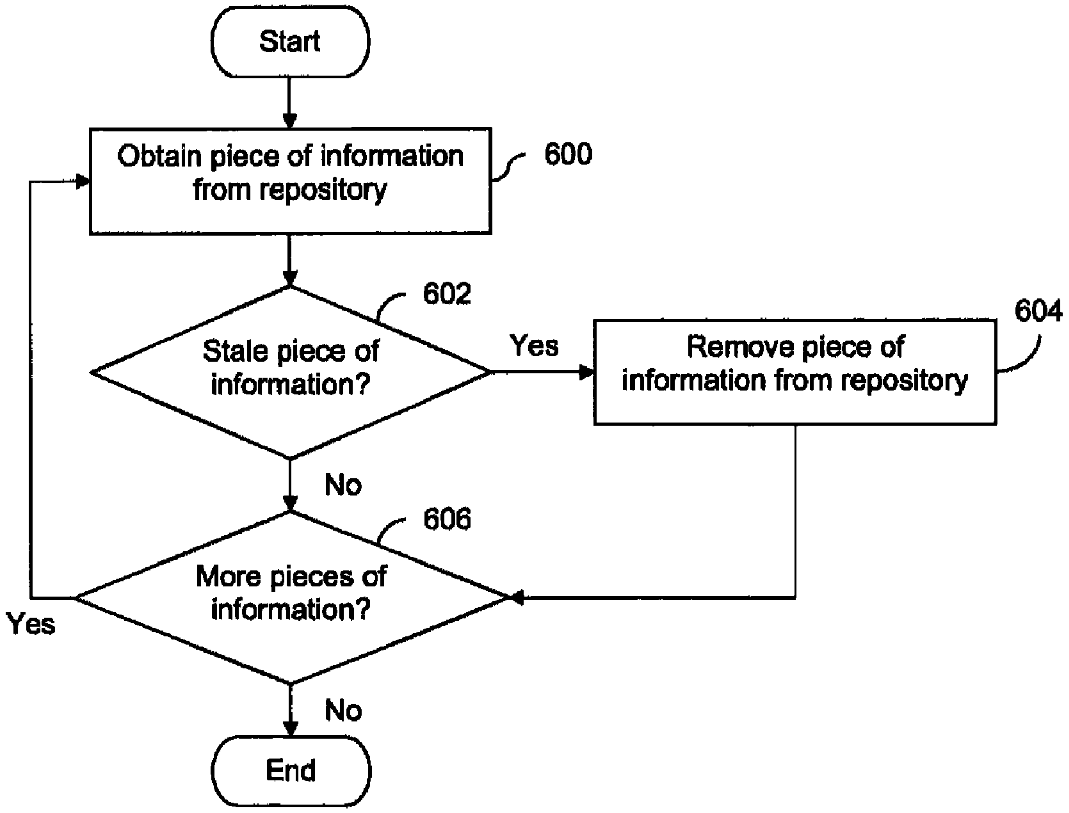
FIG. 6 is a flowchart illustrating an embodiment of a process for managing information stored in a response repository.

FIG. 6 is a flowchart illustrating an embodiment of a process for managing information stored in a response repository. In some embodiments, the example process is performed by response repository on information stored within it. In the example shown, a piece of information is obtained from the repository at 600. For example, the response of the person being matched 300*a* to match candidate 302*a* in FIG. 3 is obtained. At 602, it is determined whether the piece of information is stale. In this example, if a piece of information reaches a certain age or lifetime, it is discarded or otherwise removed from a repository. For example, if the response of person 300*a* to match candidate 302*a* in FIG. 3 occurred more than 6 months or a year ago, that piece of information is removed from the repository and is no longer used. Any lifetime may be used in deciding whether a piece of information is stale.

If the piece of information is stale, that piece of information is removed from the repository at 604. After removing the piece of information at 604 or if the piece of information is not stale, it is determined at 606 whether there are more pieces of information. If so, a next piece of information is obtained at 600. In this particular example, data is either included or it is not included. In some embodiments, data is "aged" by weighting older information lower compared to newer information.

In various embodiments, the example process of FIG. 6 is initiated using various techniques. In some embodiments, the example process is performed periodically, for example every month. In some embodiments, a system administrator is able to trigger the example maintenance process when desired.

In some embodiments, a maintenance process varies from the example shown in FIG. 6. For example, information is able to be selectively removed from a repository in some embodiments. This may be useful in situations where system administrators realize that a particular member of a match making system always responds positively to every person they have been matched with. It may be unhelpful (and in some cases detrimental) to retain information for this person in the repository since no particular thought or consideration has been displayed by the person. In some embodiments, that person is specified to the system and the system removes information associated with that user (e.g., "Remove response information provided by user X").

Figure 7:
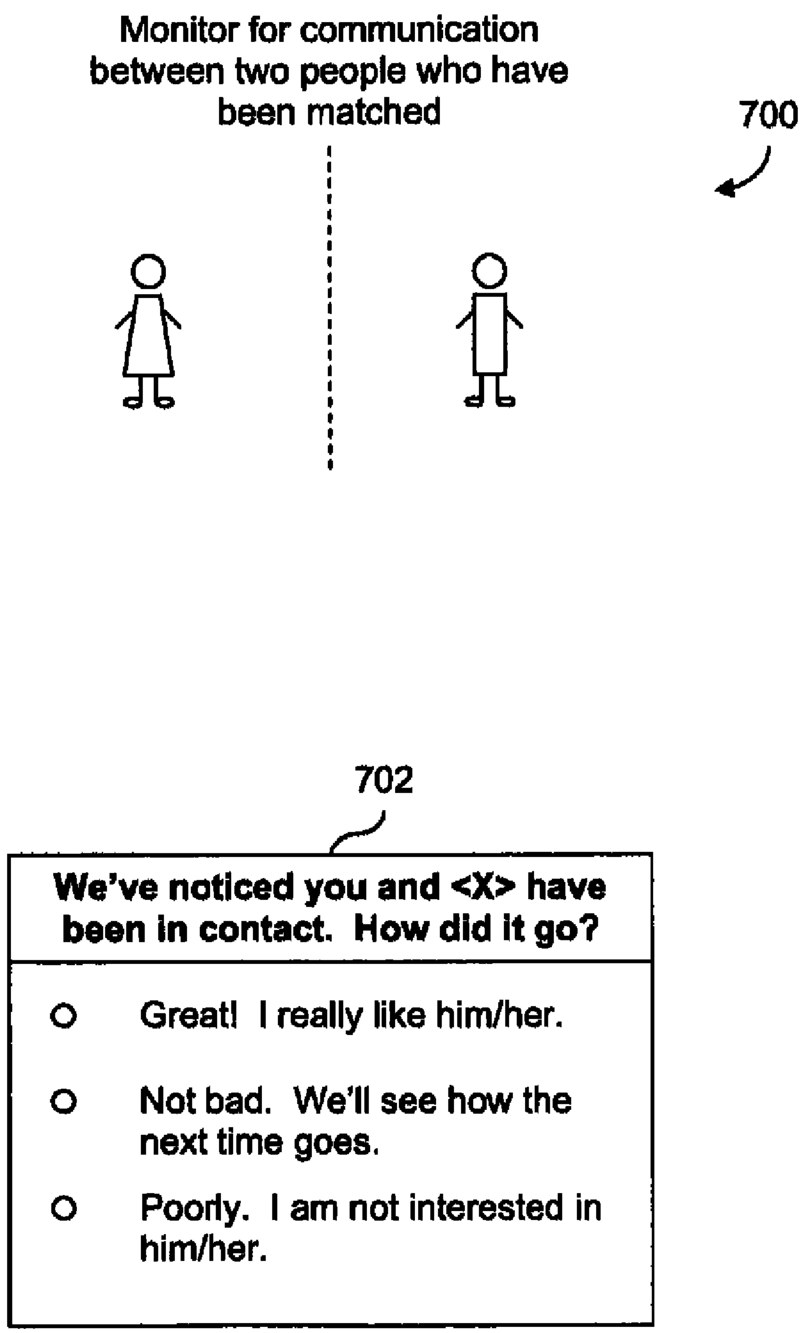
FIG. 7 is a diagram showing some embodiments for obtaining response information.

FIG. 7 is a diagram showing some embodiments for obtaining response information. In the example scenario 700, communication between two people who have been matched is monitored or otherwise observed. In some embodiments, a match making system is an online service and two people who have been matched are required to communicate via a website and the match making system is therefore able to know if two people who have been matched communicate (or not). In some embodiments, it is recorded that the matched people did not communicate after a certain amount of time passes. In some cases, only one of the people in the match is made aware of the match (e.g., only the person being matched is made aware of his/her matches whereas the selected match candidates are unaware). In some embodiments, the number of communications exchanged between the two users is recorded. For example, two people who like each other only moderately may only communicate once after being matched. Other matched pairs who have a stronger response may communicate with each other more than once.

Questionnaire 702 is an example of a questionnaire sent to one or both people who have been matched after they have contacted each other. Some examples of how the people may contact or communicate with each other include a written communication, a telephone call, an in-person meeting, etc. In this particular example, three predefined responses are provided: "Great! I really like him/her," "Not bad. We'll see how the next time goes," and "Poorly. I am not interested in him/her." In various embodiments, other predefined responses are used such as a number or value. In some embodiments, a user can provide a free form response.

Figure 8:
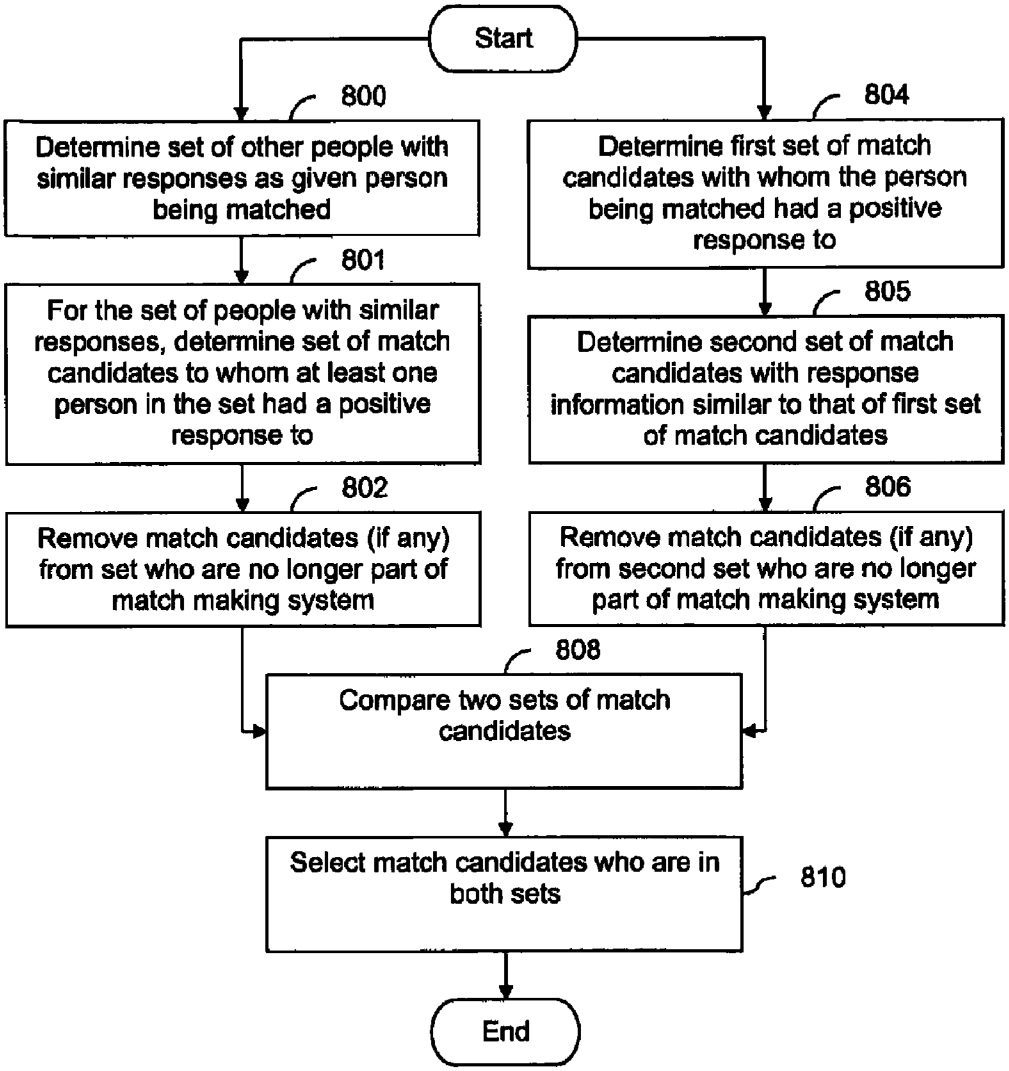
FIG. 8 is a flowchart illustrating an embodiment of a process for matching people by determining people who had similar responses and determining match candidates who are similar to match candidates the person being matched is known to have liked.

FIG. 8 is a flowchart illustrating an embodiment of a process for matching people by determining people who had similar responses and determining match candidates who are similar to match candidates the person being matched is known to have liked. In the example shown, the techniques shown in FIGS. 3 and 4 are both used. In particular, steps 800-802 correspond to FIG. 3 and steps 804-806 correspond to FIG. 4. In some embodiments, the example process of FIG. 8 is used in step 508 of FIG. 5. In some embodiments, some other method is used to incorporate the techniques of both FIGS. 3 and 4 in selecting match candidates.

At 800, a set of other people with similar responses as a given person being matched is determined. For example, in FIG. 3, person 300*c* had similar responses to certain match candidates as the person being matched (300*a*). In some embodiments, negative responses or dislikes are considered in addition to or as an alternative to positive responses. For the set of people with similar responses, a set of match candidates to whom at least one person in the set had a positive response to is determined. For example, person 300*c* also liked match candidate 302*c*. At 802, match candidates (if any) who are no longer part of a match making system are removed from the set.

At 804, a first set of match candidates with whom the person being matched had a positive response to is determined. For example, in FIG. 4, the person being matched (400*a*) is known to have liked match candidate 402*a*. At 805, a second set of match candidates with response information similar to that of the first set of match candidates is determined. Continuing with the previous example, match candidate 402*a* would be in the first set and match candidate 402*c* would be in the second set. At 806, match candidates (if any) who are no longer part of a match making system are removed from the set.

At 808, the two sets of match candidates are compared. At 810, match candidates who are in both sets are selected.

Figure 9:
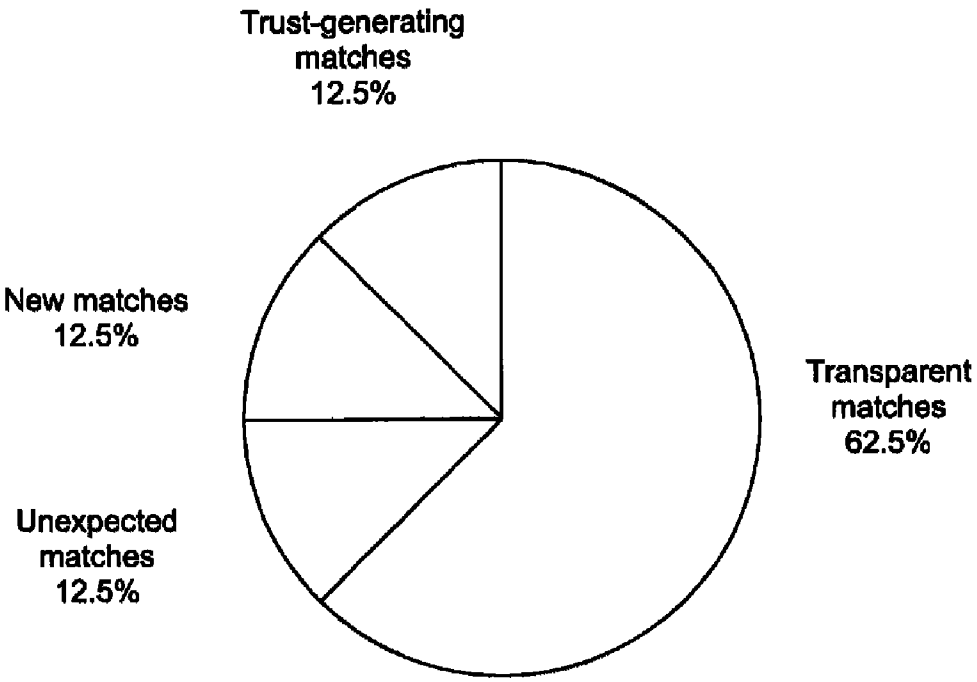
FIG. 9 is pie chart illustrating an embodiment of different types of matches for a person being matched.

FIG. 9 is pie chart illustrating an embodiment of different types of matches for a person being matched. In the example shown, multiple match candidates are selected for a person being matched based on a variety of match techniques. The percentages and types of match techniques shown in this pie chart are merely exemplary; in some other embodiments the set of match techniques and/or percentages are different from the example shown here.

In this example, 62.5% of the selected match candidates are transparent matches. As used herein, a transparent match is one for which the person being matched is able to see a clear connection or reason as to why a match candidate was selected. For example, the match candidates selected may have one or more demographics (e.g., age, income, education level, income level, etc.) that satisfy a preference specified by the person being matched. In some embodiments, a transparent match is made based on psychographic data (e.g., for the person being matched and/or the match candidates). For example, techniques which use psychographic information may tend to match people with similar personalities together. In some embodiments, some or all of the transparent matches are made using collaborative filtering.

12.5% of the selected match candidates are unexpected matches. As used herein, an unexpected match is one for which the user may not necessarily see a clear reason why a given match candidate is selected. In some embodiments, an unexpected match is made by selecting a match candidate randomly. In some embodiments, an unexpected match is made using collaborative filtering, where (for example) the unexpected match does not necessarily satisfy specified preferences and/or is different compared to previously selected match candidates. One benefit of an unexpected match is to have the person being matched meet and/or consider people whom they might not necessarily consider on their own. Another benefit is that a match making system configured to perform collaborative filtering will be able to obtain response information for a variety of match candidates (e.g., not just for transparent matches).

12.5% of the selected match candidates are new match candidates. A new match candidate someone who has provided relatively little response information about other users and/or for whom relatively few other users have provided response information. Selecting new match candidates may be particularly useful in match making systems that are configured to perform collaborative filtering since decisions are based on response information. In some cases, the decisions (i.e., matches) made by a collaborative filtering match making system tend to improve as more information is obtained and by ensuring new match candidates are being selected, more information generated by or pertaining to these new users can be obtained.

The remaining 12.5% of the selected matches are trust-generating matches. A trust-generating match is one in which the system has a high confidence, for example because those particular match candidates have been rated many times and have consistently high responses by other users. In some embodiments, an average rating or response value is used.

Although a system may select a particular percentage of match candidates using a particular technique as shown in this figure, a match making system does not necessarily indicate to a user which selected match candidates fall into which category. In some cases indicating which person was selecting using which technique causes a user to be predisposed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for matching people, comprising:
- obtaining response information associated with previous matches for a set of people;
- obtaining response information associated with previous matches for a person being matched, wherein:
  - obtaining the response information for the person being matched includes monitoring, at an intermediary, any communications exchanged between the person being matched and a previous match partner;
- using a processor to select, based at least in part on (1) the response information associated with previous matches for the person being matched and (2) the response information associated with previous matches for the set of people, a similar person in the set of people who has response information similar to the person being matched;
- using the processor to select a match candidate, from a set of match candidates who have been matched to the similar person, based at least in part on the response information associated with previous matches for the set of people, wherein: (1) the selected match candidate has not previously been matched with the person being matched and (2) the response information for the similar person indicates that the similar person had a positive response to the selected match candidate; and
- sending information associated with the selected match candidate to the person being matched.

2. The method of claim 1, wherein the response information associated with the person being matched includes one or more of the following: (1) response information provided by the person being matched in regards to previous match partners or (2) response information provided by previous match partners in regards to the person being matched.

3. The method of claim 1, wherein there is at least one person in both the set of people for which response information is obtained and in the set of match candidates.

4. The method of claim 1, wherein there is at least one person in the set of people for which response information is obtained who is not in the set of match candidates.

5. The method of claim 1 further comprising pre-screening the set of match candidates prior to selecting.

6. The method of claim 5, wherein pre-screening is based at least in part on one or more of the following: (1) one or more preferences specified by the person being matched or (2) psychographic data.

7. The method of claim 1, wherein obtaining response information includes one or more of the following: (1) obtaining negative response information, (2) accessing a repository, (3) tracking whether a first person in a given match contacts a second person in the given match, or (4) sending one or more questions to a first person in a given match after the first person and a second person in the given match have been in contact and receiving from the first person a response to the one or more questions.

8. The method of claim 7, wherein the contact between the first person and the second person includes at least one of: a telephone call, a written communication, or an in-person meeting.

9. The method of claim 7, wherein the one or more questions include a plurality of pre-defined ratings for the second person.

10. The method of claim 1, wherein selecting is performed in the event one or more of the following occurs: (1) an amount of response information associated with the person being matched exceeds a threshold amount or (2) the person being matched has provided an amount of response information in regards to previous match partners which exceeds a threshold amount.

11. The method of claim 1 further comprising:

selecting a second match candidate from the set of match candidates, wherein the second match candidate has an amount of response information associated with himself/herself which exceeds a threshold amount and the response information associated with the second match candidate is positive; and sending information associated with the second match candidate to the person being matched.

12. The method of claim 1, wherein sending occurs after the person being matched has concluded communication with another match candidate.

13. A system for matching people, comprising:

a receiving interface configured to:

obtain response information associated with previous matches for a set of people; and obtain response information associated with previous matches for a person being matched, wherein:

obtaining the response information for the person being matched includes monitoring, at an intermediary, any communications exchanged between the person being matched and a previous match partner;

a processor configured to:

select, based at least in part on (1) the response information associated with previous matches for the person being matched and (2) the response information associated with previous matches for the set of people, a similar person in the set of people who has response information similar to the person being matched; and select a match candidate, from a set of match candidates who have been matched to the similar person, based at least in part on the response information associated with previous matches for the set of people, wherein: (1) the selected match candidate has not previously been matched with the person being matched and (2) the response information for the similar person indicates that the similar person had a positive response to the selected match candidate; and a transmitting interface configured to send information associated with the selected match candidate to the person being matched.

14. A computer program product for matching people, the computer program product being embodied in a non-transitory computer readable storage medium and comprising computer instructions for:

obtaining response information associated with previous matches for the set of people;

obtaining response information associated with previous matches for a person being matched, wherein:

obtaining the response information for the person being matched includes monitoring, at an intermediary, any communications exchanged between the person being matched and a previous match partner;

selecting, based at least in part on (1) the response information associated with previous matches for the person being matched and (2) the response information associated with previous matches for the set of people, a similar person in the set of people who has response information similar to the person being matched;

selecting a match candidate, from a set of match candidates who have been matched to the similar person, based at least in part on the response information associated with previous matches for a set of people, wherein: (1) the selected match candidate has not previously been matched with the person being matched and 2 the response information for the similar person indicates that the similar person had a positive response to the selected match candidate; and sending information associated with the selected match candidate to the person being matched.

15. The system of claim 13, wherein:

the processor is further configured to select a second match candidate from the set of match candidates, wherein the second match candidate has an amount of response information associated with himself/herself which exceeds a threshold amount and the response information associated with the second match candidate is positive; and the transmitting interface is further configured to send information associated with the second match candidate to the person being matched.

16. The computer program product of claim 14, further comprising computer instructions for:

selecting a second match candidate from the set of match candidates, wherein the second match candidate has an amount of response information associated with himself/herself which exceeds a threshold amount and the response information associated with the second match candidate is positive; and sending information associated with the second match candidate to the person being matched.

17. The method of claim 1 further comprising:

selecting a second match candidate from the set of match candidates, wherein the second match candidate has no response information associated with himself/herself; and sending information associated with the second match candidate to the person being matched.

18. The system of claim 13, wherein:

the processor is further configured to select a second match candidate from the set of match candidates, wherein the second match candidate has no response information associated with himself/herself; and the transmitting interface is further configured to send information associated with the second match candidate to the person being matched.

19. The computer program product of claim 14, further comprising computer instructions for:

selecting a second match candidate from the set of match candidates, wherein the second match candidate has no response information associated with himself/herself; and sending information associated with the second match candidate to the person being matched.

20. The method of claim 1, wherein using the processor to select includes determining a weight associated with the similar person which varies in accordance with a number of matching responses between the similar person and the person being matched.

21. The system of claim 13, wherein the processor is configured to select by determining a weight associated with the similar person which varies in accordance with a number of matching responses between the similar person and the person being matched.

22. The computer program product of claim 14, wherein the computer instructions for selecting include computer instructions for determining a weight associated with the similar person which varies in accordance with a number of matching responses between the similar person and the person being matched.

* * * * *